United States Patent
Sweet et al.

(10) Patent No.: US 9,511,853 B2
(45) Date of Patent: Dec. 6, 2016

(54) MOTOR AND GEARING SYSTEM FOR AIRCRAFT WHEEL

(75) Inventors: Robert M. Sweet, Beaver, UT (US); Jonathan S. Edelson, Portland, OR (US)

(73) Assignee: Borealis Technical Limited, Gibraltar (GI)

( * ) Notice: Subject to any disclaimer, the term of this patent is extended or adjusted under 35 U.S.C. 154(b) by 257 days.

(21) Appl. No.: 13/479,269

(22) Filed: May 24, 2012

(65) Prior Publication Data
US 2013/0062466 A1   Mar. 14, 2013

Related U.S. Application Data

(60) Provisional application No. 61/489,592, filed on May 24, 2011.

(51) Int. Cl.
*B64C 25/34* (2006.01)
*B64C 25/40* (2006.01)
(Continued)

(52) U.S. Cl.
CPC ............. *B64C 25/34* (2013.01); *B60K 7/0007* (2013.01); *B60L 3/0061* (2013.01); *B60L 15/2045* (2013.01); *B64C 25/405* (2013.01); *H02K 7/116* (2013.01); *B60L 2200/10* (2013.01); *B60L 2200/26* (2013.01); *B60L 2220/44* (2013.01); *B60L 2240/36* (2013.01); *B60L 2240/421* (2013.01); *B60L 2240/423* (2013.01);
(Continued)

(58) Field of Classification Search
CPC ............................. B64C 25/405; B64C 25/34

USPC .......................................... 244/100 R, 103 R
See application file for complete search history.

(56) References Cited

U.S. PATENT DOCUMENTS

| 2,430,163 A | 11/1947 | Dever |
| 3,711,043 A | 1/1973 | Cameron-Johnson |

(Continued)

FOREIGN PATENT DOCUMENTS

| WO | 0032462 A | 6/2000 |
| WO | 2010136868 A1 | 12/2010 |

OTHER PUBLICATIONS

K. T. Chau et al, "Design of a Magnetic-Geared Outer-Rotor Permanent Magnet Brushless Motor for Electric Vehicles," IEEE Transactions on Magnetics, vol. 43, No. 6, Jun. 2007.
(Continued)

*Primary Examiner* — Christopher P Ellis
*Assistant Examiner* — Jessica Wong

(57) ABSTRACT

A compact in-wheel vehicle motor and gearing system designed to meet high power and torque requirements for driving a vehicle on the ground independently of other power sources is provided. The motor and gearing system includes a motor assembly with an outside rotor element mounted for rotation about an inside stator element and a gear assembly with a plurality of gear stages mounted inside the stator and drivingly connected to the motor assembly. The motor assembly and gear assembly are mounted interiorly of the wheel and completely within a space defined by the internal dimensions of the wheel. This motor and gearing system can be effectively installed in an existing aircraft wheel without changes to other components to produce a drive wheel with the torque and power required to move the aircraft independently on the ground.

11 Claims, 3 Drawing Sheets

(51) Int. Cl.
*B60K 7/00* (2006.01)
*H02K 7/116* (2006.01)
*B60L 3/00* (2006.01)
*B60L 15/20* (2006.01)
*F16H 1/46* (2006.01)

(52) U.S. Cl.
CPC ............... *F16H 1/46* (2013.01); *Y02T 10/641* (2013.01); *Y02T 10/645* (2013.01); *Y02T 10/72* (2013.01); *Y02T 10/7283* (2013.01); *Y02T 50/823* (2013.01)

(56) References Cited

U.S. PATENT DOCUMENTS

| | | | | |
|---|---|---|---|---|
| 3,764,162 | A | * | 10/1973 | Rawlings .................. 280/764.1 |
| 3,918,558 | A | * | 11/1975 | Bryant ......................... 188/304 |
| 3,977,631 | A | * | 8/1976 | Jenny .......................... 244/50 |
| 5,509,492 | A | | 4/1996 | Pfannschmidt |
| 5,679,087 | A | | 10/1997 | Lutz |
| 6,657,334 | B1 | | 12/2003 | Edelson |
| 6,838,791 | B2 | | 1/2005 | Edelson |
| 7,116,019 | B2 | | 10/2006 | Edelson |
| 7,226,018 | B2 | | 6/2007 | Sullivan |
| 7,445,178 | B2 | | 11/2008 | McCoskey et al. |
| 7,469,858 | B2 | | 12/2008 | Edelson |
| 7,932,652 | B2 | | 4/2011 | DeVeny et al. |
| 8,714,481 | B2 | * | 5/2014 | Sweet ................... B64C 25/405 244/100 R |
| 2006/0065779 | A1 | | 3/2006 | McCoskey et al. |
| 2007/0042854 | A1 | * | 2/2007 | Edelson ....................... 475/149 |
| 2007/0158497 | A1 | * | 7/2007 | Edelson et al. ........... 244/103 S |
| 2008/0054733 | A1 | | 3/2008 | Edelson |
| 2009/0242692 | A1 | * | 10/2009 | Hadley et al. .................. 244/50 |
| 2010/0187044 | A1 | | 7/2010 | Nabashima et al. |
| 2010/0288873 | A1 | | 11/2010 | Cox et al. |
| 2012/0001018 | A1 | * | 1/2012 | Gilleran et al. ................ 244/50 |
| 2012/0228921 | A1 | * | 9/2012 | Essinger et al. ............... 301/6.2 |

OTHER PUBLICATIONS

Mitsubishi Motors, "MIEV:Mitsubishi in-wheel electric vehicle—A next-generation EV." (http://www.mitsubishi-motors.com/corporate/about_us/technology/envi . . . ).

* cited by examiner

MOTOR AND GEARING SYSTEM FOR AIRCRAFT WHEEL

PRIORITY CLAIM

This application claims priority from U.S. Provisional Patent Application No. 61/498,592, filed May 24, 2011, the disclosure of which is fully incorporated herein by reference.

TECHNICAL FIELD

The present invention relates generally to wheel motors for vehicles and specifically to a compact in-wheel motor and gearing system for independently driving an aircraft wheel on the ground.

BACKGROUND OF THE INVENTION

As air travel has increased over the past decades, airport facilities have become more crowded and congested. Minimizing the time between the arrival of an aircraft and its departure to maintain an airline's flight schedule, and also to make a gate or parking location available without delay to an incoming aircraft, has become an airline priority. The safe and efficient ground movement of a large number of aircraft simultaneously into and out of the ramp and gate areas has become increasingly important. As airline fuel costs and safety concerns and regulations have increased, use of the aircraft main engines is no longer the best option for achieving the desired safe and efficient ground movement.

Various alternatives to the use of an aircraft's main engines to move an aircraft on the ground have been tried. The use of a tug or tow vehicle to move an aircraft into and out of a gate or parking location can eliminate the need to use the aircraft main engines. This option, however, is not without its own challenges and costs. More ground vehicles, requiring more fuel and more ground personnel to operate them, add to an already congested environment in the gate area. Restricted use of the aircraft engines on low power during arrival at or departure from a gate is an additional option. This option is also problematic, however. Not only does engine use consume fuel, it is also noisy, and the associated safety hazards of jet blast and engine ingestion in a congested area are significant concerns that cannot be overlooked.

The use of a motor structure integrally mounted with a wheel to rotate the wheel and drive a vehicle, including an aircraft, has been proposed. The use of such a structure, ideally, could move an aircraft with minimal or no use of an aircraft's main engines. In U.S. Pat. No. 2,430,163, for example, Dever describes a motor that may be incorporated in an aircraft landing gear wheel in which the stator is mounted on a stationary part of a wheel assembly and the rotor is connected to the revolving part of the wheel to produce a high rotating torque near the periphery of the wheel. Dever does not suggest integrating a gear assembly with this wheel structure, however. U.S. Pat. No. 3,977,631 to Jenny also describes a motor assembly selectively coupled to an aircraft wheel through a rotatably mounted brake apparatus in which the normally non-rotating stator is rotatably mounted and driven. A reduction gear assembly is included in this arrangement and is positioned to facilitate mounting of a drive motor away from the cramped wheel and brake assembly. U.S. Pat. No. 7,445,178 to McCoskey et al and U.S. Pat. No. 7,226,018 to Sullivan describe, respectively, a powered nose aircraft wheel system with a multifunctional wheel motor driven by a planetary gear assembly or a direct drive and an aircraft wheel hub motor/generator with a stack of alternating rotor and stator disks, in which the rotors are coupled to the wheel. The stator winding described by Sullivan is rigidly fixed to the axle and partially contained by a rotor, which rotates on bearings about the axle.

Electric wheel motors have been proposed for drive wheels in vehicle applications other than aircraft, particularly in electric and hybrid automobiles, in motorcycles, and in rail vehicles. In-wheel permanent magnet brushless motors with rotor elements located outwardly of stator elements with magnetic gears have been described by K. T. Chau et al in several IEEE publications. Mitsubishi Motors has proposed an outer rotor motor that does not require differential gearing for its in-wheel motor electric vehicle. In International Patent Publication No. WO2010/136868, Amutham describes a gearless wheel motor with an outer rotor that employs an arrangement of magnets mounted on both the interior stator and the exterior rotor that are selectively energized to cause the rotor to rotate about the stator in a desired clockwise or counterclockwise direction. Pfannschmidt, in U.S. Pat. No. 5,509,492, suggests a wheel hub direct drive motor with an external rotor rotatably mounted on a running gear or truck link that does not require a transmission. The use of more conventional gearing elements that can produce more output power, torque, and speed than is possible with a motor alone is not suggested by any of the foregoing disclosures. Consequently, none of these outer rotor in-wheel motor designs is structured to accommodate such gear elements.

A wheel assembly with an integral electric wheel motor concentric with a non-rotating spindle attached to a heavy vehicle with a rotor that can be positioned to rotate interiorly or exteriorly of a stator connected to a planetary gear system is described in U.S. Pat. No. 7,932,652 by DeVeny et al. Brake system components are contained within and attached to the rotor. The gear system, wheel drive, and a braking system are stated to be at least partially disposed within a predetermined axial distance defined by the stator and the rotor. The entire assembly extends well beyond the described axial distance, however, with the gear box and gearing elements located off to one side of the rotor and stator. The braking system components are located within and attached to the rotor. There is no suggestion, moreover, that the arrangement of the components of the wheel drive described by DeVeny et al could be varied.

None of the foregoing art suggests an in-wheel drive system capable of powering an aircraft drive wheel that is configured to fit within the limited space available in an aircraft landing gear wheel that integrates a gear assembly within a compact, outer rotor motor. This art, moreover, does not contemplate a compact in-wheel drive system with an integral configuration of motor and gear components that can be installed or retrofitted in existing aircraft without the modification of other landing gear structures.

U.S. Pat. No. 7,469,858 to Edelson, owned in common with the present invention, describes a gear system for an aircraft wheel motor that provides the necessary torque with reasonable system mass and a mechanism for automatically decoupling the high gear ratio needed to drive the load from the load if the load overhauls. While the aforementioned gearing system is described to be located in or near a drive wheel and preferably employs an outer rotor motor, it is not suggested that the gearing could be configured to be operationally located completely within the a wheel space with an axial dimension that is not greater than the width of the wheel tire or that is defined by the interior wheel structures.

A need exists, therefore, for a motor and gearing system that can be operationally integrated within a minimal space in an aircraft or other vehicle wheel to generate optimum torque for driving the wheel on the ground. A need further exists for a compact gearing system for a vehicle, including an aircraft, drive wheel specifically configured to drive a correspondingly compact motor with an outer rotor element and an inner stator element mounted completely within the volume defined by the interior of the wheel and an axial dimension represented by the width of a tire mounted on the wheel.

SUMMARY OF THE INVENTION

It is a primary object of the present invention, therefore, to overcome the disadvantages of the prior art and to provide a compact motor and gearing system that can be operationally integrated within a minimal space in a vehicle wheel to generate optimum torque for driving the vehicle wheel on the ground.

It is another object of the present invention to provide a compact gearing system for an aircraft drive wheel specifically configured to drive a correspondingly compact motor with an outer rotor element and an inner stator element mounted completely within the volume defined by the wheel interior and an axial dimension represented by the width of a tire mounted on the wheel.

It is a further object of the present invention to provide a motor and gearing system for an outer rotor motor that effectively uses previously unutilized material closest to the center of the motor to produce optimum torque for the motor and gear system.

It is an additional object of the present invention to provide a motor and gearing system for an aircraft drive wheel in which all of the gearing is located interiorly of the stator.

It is yet another object of the present invention to provide a high powered motor and gearing system configured to fit within a smaller space than has heretofore been possible.

It is yet a further object of the present invention to provide a compact motor and gearing system for an aircraft drive wheel that can be installed on existing aircraft without replacement of the aircraft's axle, wheel, tire, piston, or other landing gear components.

In accordance with the aforesaid objects, a compact motor and gearing system for a vehicle drive wheel is provided that effectively generates the torques required to drive the wheel and the vehicle, preferably an aircraft, on the ground. The compact motor and gearing system includes a motor assembly configured with an outer rotor element and an inner stator element and a gear assembly with a plurality of gear stages mounted in driving relationship with the motor components. The motor assembly components and gear assembly components are configured and sized to fit substantially completely and operationally within the space defined by the interior wheel structures and within an axial dimension represented by the width of a tire mounted on the wheel. The motor and gearing system of the present invention is designed to be installed on existing aircraft landing gear wheels without requiring replacement of existing landing gear components.

Other objects and advantages will be apparent from the following description, claims, and drawings.

DESCRIPTION OF THE INVENTION

The many advantages of being able to drive an aircraft on the ground independently without using the aircraft main engines, as discussed above, have been acknowledged. Providing a compact motor and gear system capable of effectively producing the operating torques required to drive an aircraft wheel to move an aircraft on the ground that is sized to fit completely within available space within the wheel structure must be achieved for this to be a viable option. The present invention employs the higher torque advantages of an outer rotor motor in combination with a compact gearing arrangement that enhances these advantages to produce a higher powered motor and gearing system than has heretofore been available. This motor and gearing system, moreover, is configured and sized to fit within a smaller space than has heretofore been required. The motor and gearing system of the present invention, moreover, is designed to be installed in existing aircraft gear wheels without modification to or replacement of existing landing gear components to produce a self-propelled drive wheel that can efficiently move an aircraft on the ground without the aircraft's main engines.

Figure 1:
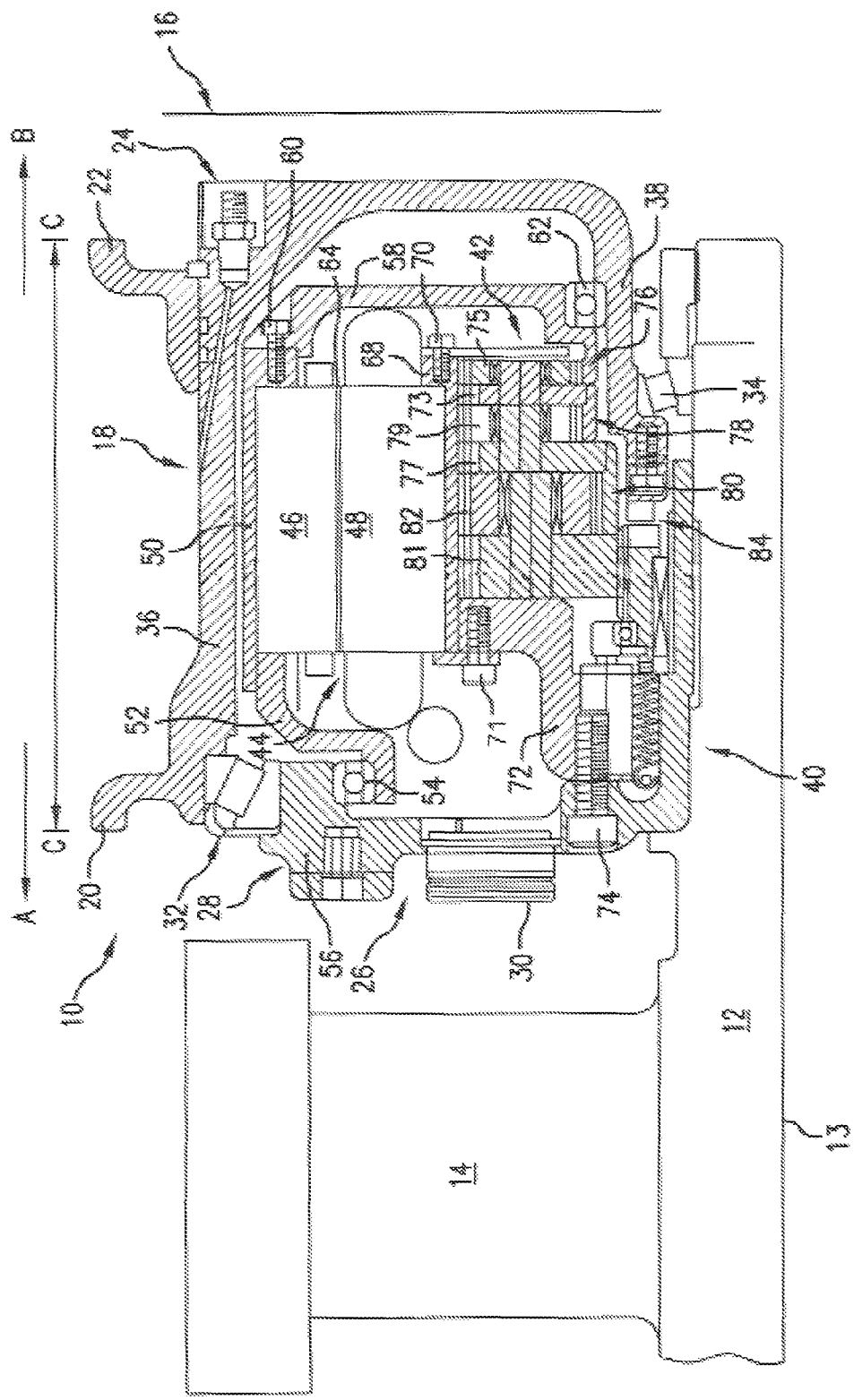
FIG. 1 is a diagrammatic cross-sectional view of the motor and gearing system of the present invention mounted on an aircraft wheel axle.

Referring to the drawings, FIG. 1 illustrates a diagrammatic cross-sectional view of one type of motor and gearing system that can be used in an aircraft gear wheel according to the present invention. While the present invention is especially suitable for use in aircraft wheels, this arrangement can be effectively employed in wheels from a range of different vehicles when it is desired to produce a drive wheel capable of generating sufficiently high torque, output power, and speed to propel the vehicle. The small volume available in a typical aircraft landing gear wheel well dictates the size of any structures that can be added to those already required.

The motor and gearing system 10 shown in FIG. 1 is shown as it appears mounted on an aircraft wheel axle 12. The arrows A and B indicate, respectively, the inboard and outboard orientation of the motor and gearing system with respect to an aircraft landing gear. A landing gear piston 14 is inboard of the system 10, and a wheel well opening, represented by vertical line 16 defines the outboard dimension of the wheel well. An integral wheel assembly 18 extends axially from the inboard to the outboard portions of the wheel well and toward the axle 12 on the outboard side of the system. The wheel 18 includes opposed flanges 20 and 22 for mounting a tire (not shown). The inboard flange 20 is preferably formed integrally with the wheel, and the outboard flange 22 is preferably not integral with the wheel assembly 18 and is demountable. The wheel assembly 18 is preferably configured to include a tire valve access assembly 24, as shown in FIG. 1. The maximum width of a tire supported by the wheel assembly 18 extends a selected axial distance, represented by line C-C, just beyond the outer extent of each tire flange 20 and 22.

An inboard portion 26 of the wheel assembly 18 is preferably configured to include an integral torque arm 28 to provide for a torque reaction. A connector 30 for receiving wiring connectors or a wiring harness (not shown) that connects the motor and gear system 10 to a source of aircraft power is additionally provided, preferably in the inboard portion 26 of the wheel assembly. Bearing structures 32 and 34 support, respectively, an upper axial wheel portion 36 of the wheel assembly 18 adjacent to the inboard wheel portion 26 and a lower axial portion 38 of the wheel assembly adjacent to the axle 12. These bearings, which are preferably large, allow removal of the wheel assembly 18 without removing any other hardware, thereby facilitating their inspection. The use of large bearings, particularly those sized to handle a larger shock load than currently used bearings, permits more travel and more evenly distributed loads, which further enhances and extends bearing life.

An axle-contacting portion 40 of the wheel assembly 18 is connected to the wheel assembly inboard portion 26 and is configured to extend along the axle 12 toward the wheel well opening 16. The wheel assembly axle-contacting portion 40 supports a gear assembly 42 and a motor assembly 44 completely within the volume defined by the wheel assembly inboard portion 26, upper axial wheel portion 36, outboard wheel portion 38, and axle-contacting portion 40. As described above, this volume has an axial dimension that is no greater, and preferably less, than the wheel tire width represented by line C-C. As a result, the motor and gearing system of the present invention has a compact size not heretofore found in an aircraft in-wheel drive motor.

Figure 2:
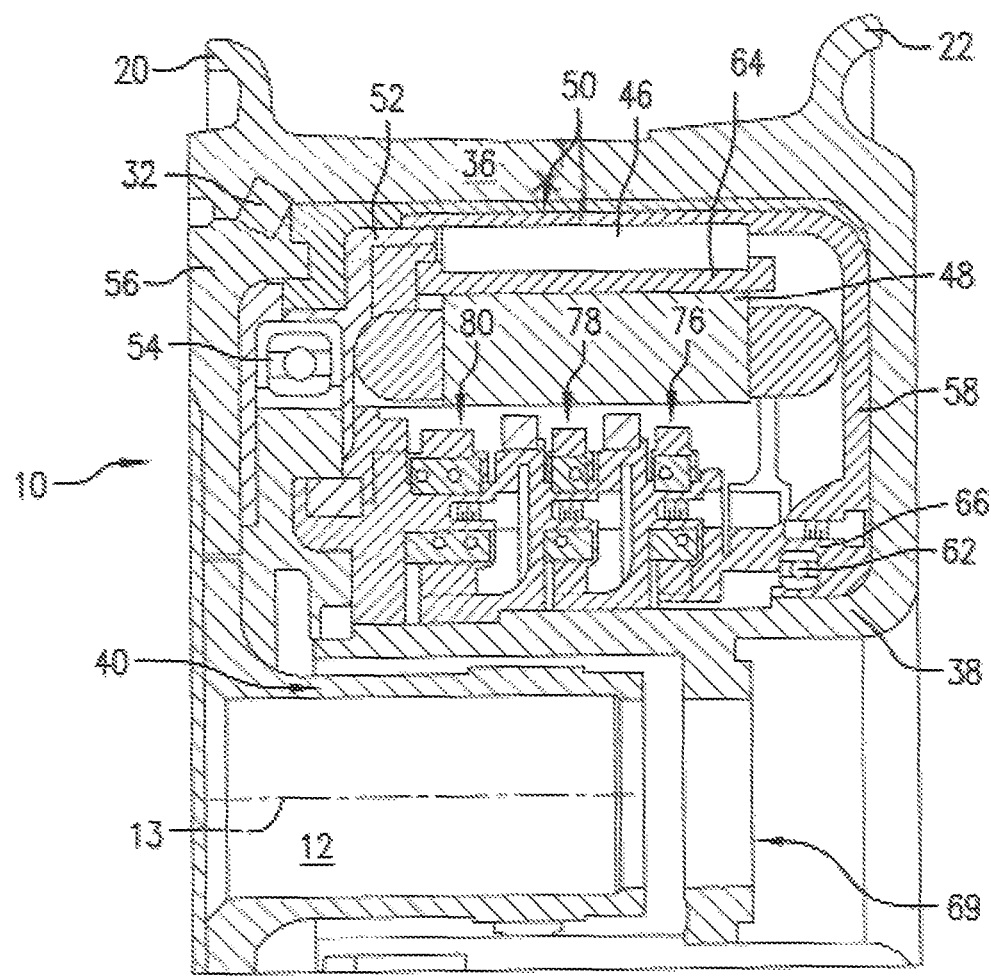
FIG. 2 is a perspective view of a model of a motor and gearing system in accordance with the present invention.
Figure 3:
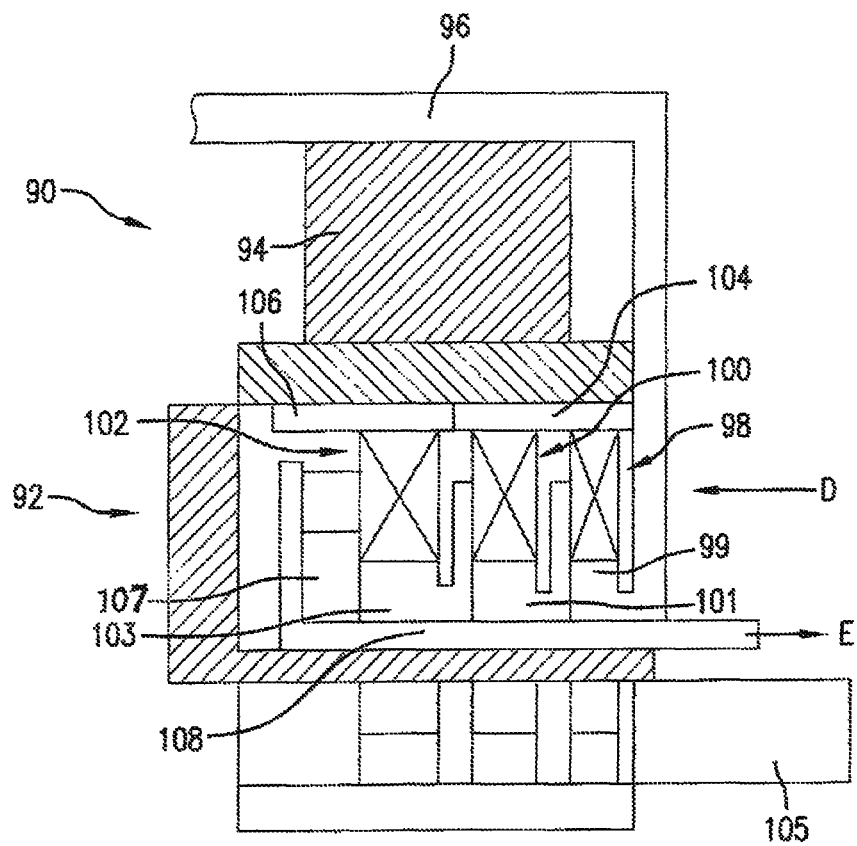
FIG. 3 is a cross-sectional view of a motor and gearing system in accordance with the present invention further illustrating the relationship between motor assembly and gear assembly components.

Only a portion of the motor and gearing system 10 is shown in the drawings. Line 13 represents the center of the axle 12; only half of the axle 12 is shown. A mirror image of the structures shown in FIGS. 1, 2, and 3 is located on the opposite side of the axle 12 from the portion of the motor and gearing system 10 shown in the drawings.

Electric motors employed as drive wheel motors are often configured with a stator element located exteriorly of a rotor element. While this arrangement produces an effective drive wheel motor, less common motor designs in which the stator is located interiorly of the rotor, so-called "outer rotor" motors have advantages that can produce an improved drive motor. For example, outer rotor, or inside-out, motors produce higher torques as the diameter of the motor becomes larger, and the rotor can be used to support the vehicle wheel. The most effective outer rotor motors use densely packed material closest to the outer extent of the motor, with the result that the material near center of the motor is not used effectively. The effective use of the "donut hole" area of the stator, for example, could be improved.

The motor and gearing system of the present invention employs a preferred outer rotor motor assembly 44 that includes a rotor element 46 positioned exteriorly of a stator element 48, as shown in FIG. 1. The rotor element 46 is attached to a rotor element support frame, which is configured to rotatably support the rotor. The rotor element support frame includes axial, inboard, and outboard rotor support sections. An axial rotor support section 50 is substantially parallel to upper axial wheel portion 36. The axial rotor support section 50 is attached to an inboard rotor element-contacting rotor support section 52 that extends toward the inboard wheel portion 26 to contact a bearing structure 54 in contact with an extension 56 of the torque arm 28. The rotor element support frame also includes an outboard rotor support section 58 that is substantially perpendicular to the axial rotor support section 50 and is connected to the axial rotor support section 50 by a bolt 60 or other suitable fastener. A bearing structure 62 is provided between the outboard rotor support section 58 and outboard wheel portion 38. The rotor element 46 is supported by axial, inboard, and outboard rotor support sections 50, 52, and 58 so that a space or gap 64 having a selected optimum width is maintained between the rotor element 46 and the stator element 48.

Virtually any type of outer rotor or inside-out type of electric motor known in the art that is capable of generating the high torque required and is sufficiently compact to fit in the available space as described herein could be used to power the in-wheel motor and gearing system of the present invention. Examples of suitable electric motors include, but are not limited to, induction type motors, high phase order motors, permanent magnet motors, switched reluctance motors, toroidally wound motors, and the like. Specific examples of electric drive motors that can be used in connection with the present invention are illustrated in U.S. Pat. Nos. 6,657,334; 6,837,791; 7,116,019; 7,469,858, the disclosures of which are incorporated herein by reference. The foregoing examples are not intended to be limiting.

The effectiveness and efficiency of the electric drive motors described above in an in-wheel environment can be enhanced by combining a high powered outer rotor motor with a compact gear assembly. A combination of a motor assembly and a gear assembly can be more space efficient and can produce more useful output power, torque, and speed than can a motor by itself. The motor and gear system 10 of the present invention overcomes the challenges encountered by combining gearing with outer rotor motors that requires both the gears and the rotor to be on or near the outside of the wheel rim to be able to generate effective torques and then to transfer these torques to the wheel. The compact gear assembly 42 of the present invention is designed to be drivingly connected to the motor assembly 44 and located within the axial dimension represented by line C-C and within the space defined by the rotor support sections 52 and 58, which is contained within the volume defined by the wheel portions 26, 36, 38, and 40. Additionally, the gear assembly 42 is operationally mounted to fit between the stator element 48 and the axle-contacting wheel portion 40.

A gear assembly support member 68 secures the gear assembly 42 adjacent to the stator element 48 by a suitable fastener or connector 70. A flange member 72 attaches the gear assembly 42 to the inboard portion of the wheel 26 through a suitable fastener or connector 74 and to the gear assembly support member 68 and the stator 48 through a suitable fastener or connector 71. Fasteners or connectors suitable for this purpose could be the bolts shown in FIG. 1 or any other similar type of appropriate fastener or connector.

A range of different gearing configurations and arrangements are possible for the gear assembly 42 of the present motor and gearing system. Preferred mechanical gearing arrangements are shown in the drawings and described below. Other types of gearing that produce the high torque density required, including but not limited to magnetic gearing, are also contemplated to be within the scope of the present motor and gearing system. The optimum output power, torque, and speed desired in an in-wheel drive motor can be achieved with a plurality of gear stages, such as the three stage planetary gear reducer configuration shown, although other gear configurations that fulfill these requirements could be used.

Each gear stage may include at least a sun gear, at least 4 to 8 planet gears, and a ring gear. In FIG. 1, the stage one gears are located at 76, the stage two gears are located at 78, and the stage three gears are located at 80. In the stage one gears 76, the sun gear is preferably the motor output. First gear stage 76 includes ring gear 73 and planet gears 75; second gear stage 78 includes ring gear 77 and planet gears 79; and third gear stage 80 includes ring gear 81 and planet gears 82. The sun gears are not visible in FIG. 1.

The characteristics of the gears used in each stage, such as gear ratio, pitch, pitch diameter, face width, and number of teeth, will be selected for optimum gear load and performance for the present motor and gearing system in accordance with the specific in-wheel vehicle environment in which the system is intended for use. These characteristics can vary in different applications.

A clutch assembly, such as the clutch assembly 84 shown in FIG. 1 adjacent to the axle-contacting portion 40 of the wheel, may optionally be provided to engage and disengage the gear assembly 42 as needed during operation of the motor assembly 44.

FIG. 2 illustrates a cross-sectional view of further aspects of the motor and gearing system 10 of FIG. 1. The same reference numbers will be used for corresponding structures in FIGS. 1 and 2. FIG. 2 illustrates the relationship between the components of the motor assembly 44 and the components of the gear assembly 42. The rotor element 46 is located adjacent to the axial wheel portion 36 exteriorly of the stator element 48 with a gap 64 therebetween. The rotor is mounted for rotation completely within the wheel on a rotor support frame that includes an axial rotor support element 50, an inboard rotor support element 52, and an outboard rotor support element 58 that communicates with a gear shaft 66 (not shown in FIG. 1). The three gear stages 76, 78, and 80, which are drivingly mounted on the gear shaft 66, are operationally configured to fit between the wheel axle 12 and the stator element 48 completely within the space defined by the rotor element support frame. The same arrangement of ring, sun, and planet gears is shown in FIGS. 1 and 2. An axle mount 69 (not shown in FIG. 1) connects the motor and gearing assembly section 10 with its mirror image section (not shown) on the opposite side of the axle 12.

FIG. 3 illustrates schematically another possible gearing arrangement for use in the motor and gearing system of the present invention that employs gear cams. Only a portion of a motor assembly 90 and gear assembly 92 of an in-wheel drive motor and gearing system are shown. A stator element 94 is located between an outer rotor element 96 and the gear assembly 92. Three gear stages 98, 100, and 102 interact with corresponding cams 99, 101, and 103 supported on a rotating shaft 105 to produce an output that drives the rotor element 96. Each gear stage preferably includes at least a sun gear and 6 planet gears (not shown). Two ring gears 104 and 106 are shown positioned axially in the gear assembly section closest to the stator 94. Ring gear 104 engages the stages 1 and 2 gears 98 and 100, and ring gear 106 engages the stage 3 gears 102. A last stage cam 107 communicates with an output tube 108 to receive the output from the gear assembly and transfer the output to the motor assembly 90. Input into the gear assembly 92 is represented by the arrow D, and output from the gear assembly is represented by the arrow E extending from the output tube 108. This arrangement of gears and cams provides an effective gearing component of a motor and gearing system according to the present invention.

Figure 4:
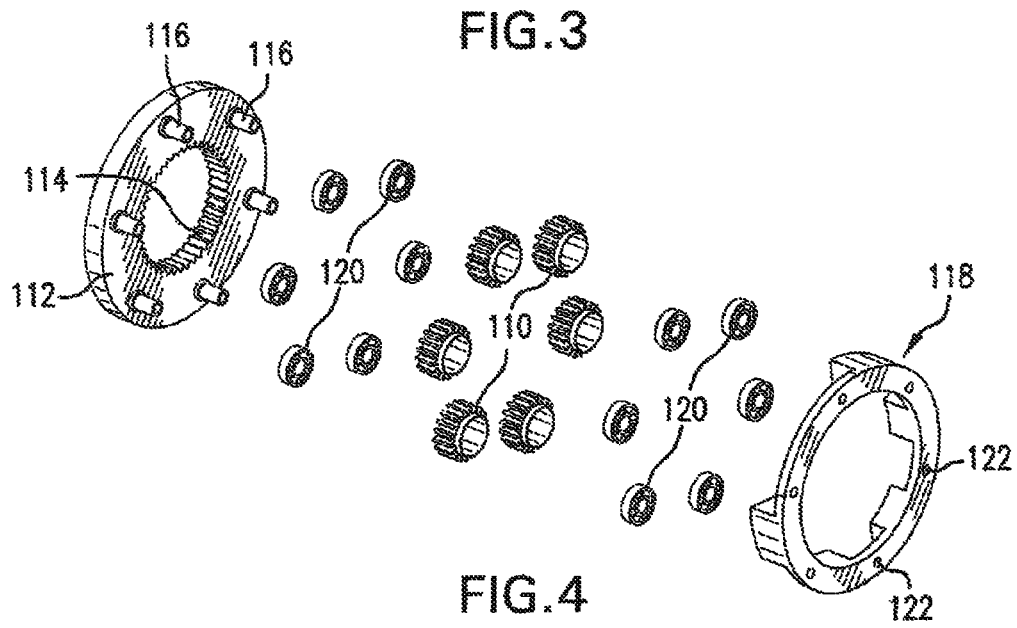
FIG. 4 is an exploded perspective view of one possible configuration of planetary gear components useful in a gear assembly for the motor and gear system of the present invention.

FIG. 4 illustrates, in exploded perspective view, the components of one arrangement of planetary gears that could be employed with the present motor and gearing system. In this arrangement, six planet gears 110 are supported on corresponding pins 116 spaced circumferentially on a planetary carrier 112 with a central gear structure 114. A locking ring 118 includes receptacles 122 to receive the pins 116 and secures the planet gears on the carrier 114. Pairs of bearing elements 120 mount the planet gears 110 for rotation on the carrier pins 116. The planetary gears will be positioned in a gear assembly in accordance with the present invention, preferably to mesh with a selected sun gear (not shown) and a selected ring gear (not shown) to drive the motor assembly rotor element 46 (FIGS. 1 and 2).

Providing adequate lubrication of the gearing components will ensure the optimum operation of these components over time. A gear box (not shown) containing the gearing components could be filled with oil and sealed. Alternatively, a semi-solid lubricant could be used with temperature sensors. Other methods of lubricating gear assembly components and maintaining them in a properly lubricated condition could also be used and are contemplated to be within the scope of the present invention.

A preferred use of the motor and gearing system of the present invention is to produce the output power, torque, and speed required to drive one or more aircraft wheels to independently move an aircraft on the ground without reliance on the aircraft's main engines or external tow vehicles. The compact configuration of the present motor and gearing system makes it especially suited to this application since space within an aircraft landing gear wheel well is at a premium. The present in-wheel motor and gearing system could also be used to power many different kinds of vehicles in addition to aircraft, including but not limited to, construction vehicles, military vehicles, automobiles, trucks, rail cars, and the like. A compact, high power, geared in-wheel electric motor, such as that described herein, is capable of moving these and other types of vehicles more effectively and efficiently than currently available drive motors.

A significant advantage of the design of the compact motor and gearing system 10 of the present invention is achieved when this system is installed in an existing aircraft. The installation of the present motor and gearing system permits the continued use of an aircraft's existing tires, axle, and piston that are already in use on the aircraft. Since these structures are not altered from their original condition or other wise changed in any way by the installation of the present motor and gearing system, the rim width, tire bead, and bead seat would not require recertification by the Federal Aviation Administration (FAA) or other certifying authorities, thus eliminating a potentially lengthy and costly process.

The motor and gearing system described herein has been described with respect to preferred embodiments. This is not intended to be limiting, and other, equivalent, structures and arrangements that perform the required functions are also contemplated to be within the scope of the present invention.

INDUSTRIAL APPLICABILITY

The motor and gearing system of the present invention will find its primary applicability and use in aircraft and other vehicles in which a motor and gearing system capable of generating the torque and power required to drive the aircraft or other vehicle on the ground must be operationally configured to fit into the small space available within a wheel. The motor and gearing system of the present invention is also particularly well-suited to be retrofitted in wheels in existing aircraft and other vehicles.

The invention claimed is:

1. A compact in-wheel vehicle drive system designed to meet high power and torque requirements for driving a vehicle on a ground surface independently of other power sources, comprising:
   a. a vehicle with a vehicle wheel assembly comprising a plurality of wheel sections supported on an axle of said vehicle between a defined inboard axial extent and a defined outboard axial extent and connected to define an internal volume within said plurality of wheel sections, wherein said plurality of connected wheel sections comprises an inboard portion, an axle-contacting portion, an outboard portion, and an upper axial portion, and an axial distance of said defined internal volume is not greater than a width of a tire mounted on said upper axial portion;
   b. a rotor element support frame mounted interiorly within said plurality of wheel sections within said defined internal volume comprising at least an axial rotor support section interiorly adjacent and parallel to said upper axial portion, an inboard rotor support section interiorly adjacent to said inboard portion, and an outboard rotor support section interiorly adjacent to said outboard portion and perpendicular to said axial rotor frame section, wherein said rotor element support frame defines a space within said defined internal volume smaller than said defined internal volume;
   c. an electric motor assembly mounted completely within said defined space comprising a stator element and a rotor element positioned outwardly of said stator element to maintain a gap having a selected optimum width between said rotor element and said stator element, said rotor element being attached to said rotor element support frame and rotationally supported by said rotor element support frame within said defined space; and
   d. a gear assembly comprising a plurality of gear stages mounted for rotation on a gear shaft operationally mounted with said electric motor assembly within the defined space between said stator element and said axle-contacting portion of said wheel assembly.

2. The system described in claim 1, further comprising a gear assembly support member securing said gear assembly to said stator element and a flange member attaching said gear assembly said inboard portion of said wheel.

3. The system described in claim 1, wherein said plurality of gear stages comprises at least three gear stages drivingly mounted for rotation on said gear shaft and drivingly connected to said motor assembly, and each of said gear stages comprises at least a ring gear and a plurality of planet gears selected to produce desired output power, torque, and speed for driving said vehicle positioned in driving relationship with said gear shaft and said ring gear.

4. The system described in claim 1, further comprising a clutch assembly in engaging and disengaging contact with said gear assembly operatively positioned interiorly of the rotor element support frame completely within the defined space.

5. The system described in claim 1, wherein said vehicle comprises an aircraft, said vehicle wheel comprises an aircraft landing gear wheel, and said vehicle wheel assembly comprises at least said axial, inboard, outboard, and axle-contacting wheel sections connected to form an aircraft wheel assembly with said defined internal volume.

6. The system described in claim 5, wherein said aircraft wheel assembly wheel sections are positioned to fit completely within the axial distance between a landing gear piston and a landing gear wheel well opening on said aircraft, said defined internal volume has an axial distance not greater than the width of said aircraft tire, and said defined space has an axial distance smaller than the axial distance of said defined internal volume.

7. The system described in claim 1, wherein said gear assembly comprises a plurality of cams corresponding to said plurality of gear stages and said plurality of gear stages are positioned to interact with said cams to drive said rotor element at a desired torque.

8. The system described in claim 7, wherein said plurality of gear stages comprises at least three gear stages and each of said gear stages includes at least a sun gear, a planet gear, and a ring gear.

9. The system described in claim 8, wherein each of said at least three gear stages is positioned to interact with a corresponding cam.

10. The system described in claim 1, wherein said vehicle is selected from the group comprising construction vehicles, military vehicles, automobiles, trucks, and rail cars.

11. The system described in claim 6, wherein said electric motor assembly with said rotor element positioned outwardly of said stator element is selected from the group comprising induction type motors, high phase order motors, permanent magnet motors, switched reluctance motors, and toroidally wound motors.

* * * * *